(12) United States Patent
Puckett et al.

(10) Patent No.: US 10,534,136 B1
(45) Date of Patent: Jan. 14, 2020

(54) HIGH-EFFICIENCY FIBER-TO-WAVEGUIDE COUPLER

(71) Applicant: Honeywell International Inc., Morris Plains, NJ (US)

(72) Inventors: Matthew Wade Puckett, Scottsdale, AZ (US); Jianfeng Wu, Tucson, AZ (US); Neil A. Krueger, Saint Paul, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/223,548

(22) Filed: Dec. 18, 2018

(51) Int. Cl.
*G02B 6/26* (2006.01)
*G02B 6/30* (2006.01)

(52) U.S. Cl.
CPC .................................. *G02B 6/305* (2013.01)

(58) Field of Classification Search
CPC ....... G02B 6/1228; G02B 6/305; G02B 6/036
See application file for complete search history.

(56) References Cited

U.S. PATENT DOCUMENTS

| | | | |
|---|---|---|---|
| 6,181,860 B1 * | 1/2001 | Granestrand | G02B 6/305 385/129 |
| 7,065,272 B2 | 6/2006 | Taillaert et al. | |
| 7,317,853 B2 * | 1/2008 | Laurent-Lund | G02B 6/1228 385/129 |
| 7,643,710 B1 | 1/2010 | Liu | |
| 9,164,235 B1 | 10/2015 | Tummidi et al. | |
| 9,316,788 B2 | 4/2016 | Witzens | |
| 9,703,047 B2 * | 7/2017 | Painchaud | G02B 6/305 |
| 2003/0053756 A1 * | 3/2003 | Lam | G02B 6/1228 385/49 |

(Continued)

FOREIGN PATENT DOCUMENTS

| | | |
|---|---|---|
| WO | 2018002675 A1 | 1/2018 |
| WO | 2018024347 A1 | 2/2018 |
| WO | 2018130285 A1 | 7/2018 |

OTHER PUBLICATIONS

Khilo, Anatol, et al.; "Efficient planar fiber-to-chip coupler based on two-stage adiabatic evolution"; Jul. 19, 2010; pp. 15790-15806; vol. 19, No. 15; Optics Express.

(Continued)

*Primary Examiner* — Ellen E Kim
(74) *Attorney, Agent, or Firm* — Fogg & Powers LLC

(57) ABSTRACT

An optical coupler comprises a waveguide structure including a first waveguide layer having proximal and distal ends, the first waveguide layer including a first pair of waveguides that extend from the proximal end along a first portion, wherein the first pair of waveguides each widen along a second portion such that the first pair of waveguides merge into a single waveguide. A second waveguide layer is separated from the first waveguide layer, with the second waveguide layer having proximal and distal ends, the second waveguide layer including a second pair of waveguides that extend from the proximal end of the second waveguide layer along a first portion of the second waveguide layer, wherein the second pair of waveguides each narrow along a second portion of the second waveguide layer to separate distal tips. The waveguide structure matches an integrated photonics mode to a fiber mode supported by an optical fiber.

18 Claims, 7 Drawing Sheets

(56) References Cited

U.S. PATENT DOCUMENTS

| | | | |
|---|---|---|---|
| 2012/0230635 A1* | 9/2012 | Yoshida | G02B 6/125 385/43 |
| 2013/0170807 A1* | 7/2013 | Hatori | G02B 6/1228 385/129 |
| 2013/0230274 A1 | 9/2013 | Fish | |
| 2013/0266263 A1* | 10/2013 | Kwon | G02B 6/305 385/43 |
| 2015/0247974 A1* | 9/2015 | Painchaud | G02B 6/305 385/14 |
| 2016/0085026 A1* | 3/2016 | Yamasaki | G02B 6/1228 385/43 |
| 2018/0011249 A1 | 1/2018 | Zhu et al. | |
| 2019/0265410 A1* | 8/2019 | Testa | G02B 6/1228 |

OTHER PUBLICATIONS

Tao, S.H., et al.,; "Improving coupling efficiency of fiber-waveguide coupling with a double-tip coupler"; Dec. 8, 2008; pp. 20803-20808; vol. 16, No. 25; Optics Express.

Yoo, Keon, et al.; "Design of a High-efficiency Fiber-to-chip Coupler with Reflectors"; Apr. 30, 2016; pp. 123-128; vol. 5, No. 2; IEIE Transactions on Smart Processing and Computing.

* cited by examiner

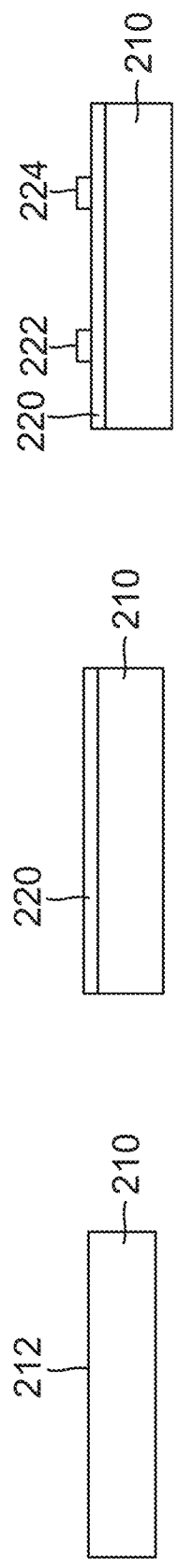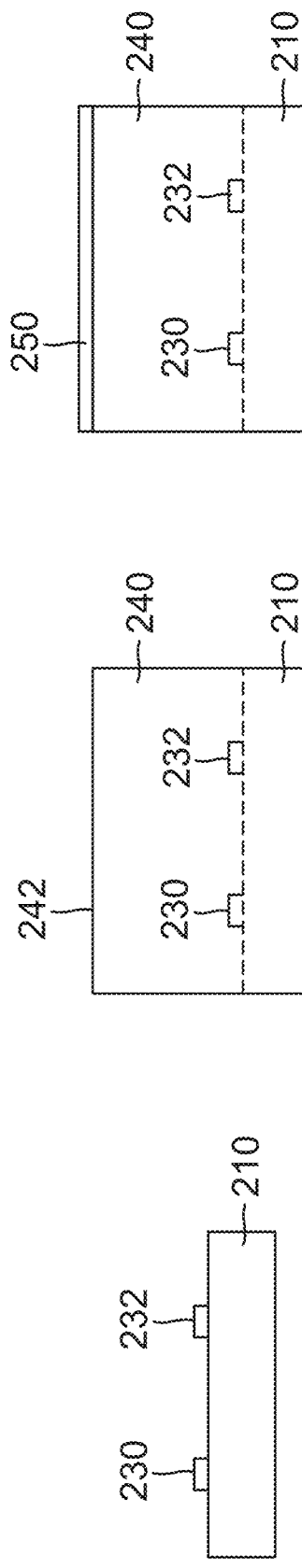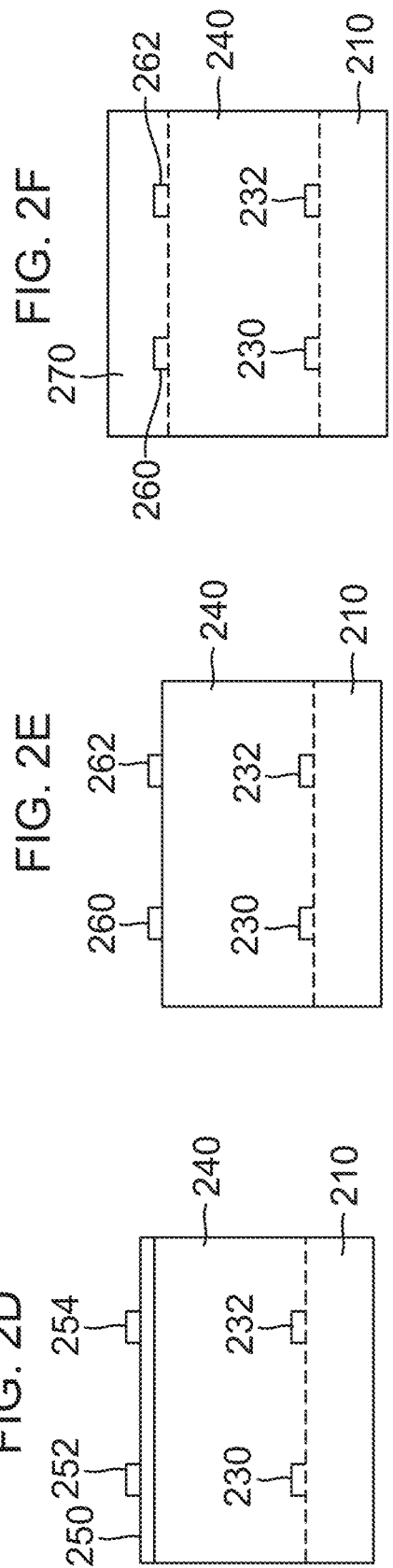

HIGH-EFFICIENCY FIBER-TO-WAVEGUIDE COUPLER

BACKGROUND

Integrated photonics offers significant advantages over fiber and free-space optics for a wide range of applications due to its ability to miniaturize optical fields while maintaining high degrees of robustness, resulting in reduced size, weight, and power consumption. Currently, one of the most significant limiting factors facing integrated photonics is the difficulty in interfacing with fiber optics. In coupling light from a fiber to a waveguide, several decibels of power are typically lost.

In prior approaches, lensed fibers or ultra-high numerical aperture fibers are butt-coupled to inverse tapers in integrated photonics chips. The minimum total facet loss that has been achieved in this way is about 0.4 dB, which corresponds to roughly 90% coupling efficiency. However, for many applications an even higher efficiency, ideally approaching 100%, is desired.

Thus, there is a need for a high-efficiency coupler with the flexibility to be applied to many different integrated photonics platforms.

SUMMARY

An optical coupler comprises a waveguide structure including a first waveguide layer having a proximal end and a distal end, the first waveguide layer including a first pair of waveguides that extend from the proximal end along a first portion of the first waveguide layer, wherein the first pair of waveguides each widen along a second portion of the first waveguide layer such that the first pair of waveguides merge into a single waveguide toward the distal end. A second waveguide layer is separated from the first waveguide layer, with the second waveguide layer having a proximal end and a distal end, the second waveguide layer including a second pair of waveguides that extend from the proximal end of the second waveguide layer along a first portion of the second waveguide layer, wherein the second pair of waveguides each narrow along a second portion of the second waveguide layer to separate distal tips at the distal end of the second waveguide layer. The waveguide structure is configured to match an integrated photonics mode to a fiber mode supported by an optical fiber.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which:

FIGS. 2A-2I are end views depicting an exemplary method of fabricating a fiber-to-waveguide optical coupler;

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A high-efficiency fiber-to-waveguide coupler is described herein. In general, the fiber-to-waveguide coupler includes a multi-layer waveguide structure that matches an integrated photonics mode to the mode supported by a standard optical fiber. The mode matching of the present approach, combined with subsequent adiabatic transitions, result in a higher efficiency for coupling from a fiber mode to a waveguide mode. This mode matching can be extended to support a wide range of different material platforms.

For example, the fiber-to-waveguide coupler can be implemented in a resonator fiber-optic gyroscope (RFOG), to direct light into and out of an optical resonator of the RFOG. The greater coupling efficiency of the fiber-to-waveguide coupler can lead to significant improvements in RFOG performance. In other implementations, the fiber-to-waveguide coupler can be employed to direct light onto chip-scale light detection and ranging (LIDAR) devices. The fiber-to-waveguide coupler can also be used as an optical interconnect for a variety of optical devices.

In one embodiment, the fiber-to-waveguide coupler can be made by fabricating silicon nitride-on-insulator waveguides comprising two separate nitride layers, through conventional lithography, dry etching, and deposition techniques. The thickness of the two separate nitride layers, as well as the separation between them, is selected to result in a two-layer waveguide mode. Following this structure, the method of fabrication adiabatically widens and combines the two waveguides in the upper (or lower) waveguide layer, then subsequently narrows and terminates the two waveguides in the lower (or upper) waveguide layer.

To couple light into a device, an optical fiber is positioned into alignment with the fiber-to-waveguide coupler. For example, the optical fiber can be brought into direct contact with a diced edge of a chip, at which point the fiber-to-waveguide coupler is positioned. The optical fiber can be optionally bonded to a facet of the fiber-to-waveguide coupler using index matching epoxy.

The efficiency of the initial hand-off from the fiber mode to the waveguide mode is theoretically simulated to be greater than about 99%, and the following adiabatic transition into a single waveguide layer is theoretically simulated to be greater than about 99.9%.

Further details of various embodiments are described hereafter with reference to the drawings.

Figure 1:
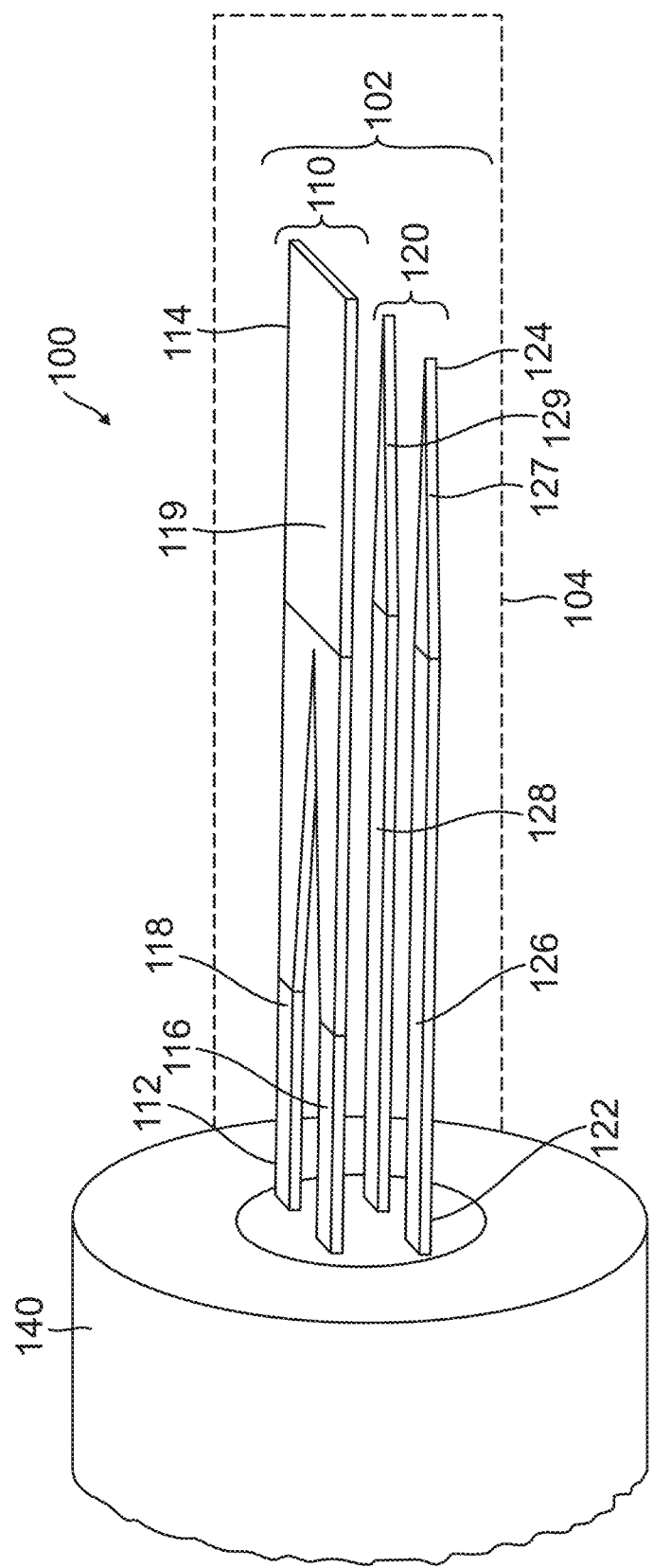
FIG. 1 is a perspective side view of a fiber-to-waveguide optical coupler, according to one embodiment.

FIG. 1 illustrates a fiber-to-waveguide optical coupler 100, according to one embodiment. The optical coupler 100 comprises a waveguide structure 102 surrounded by and embedded in a cladding 104. The waveguide structure 102 includes a first waveguide layer 110, and a second waveguide layer 120 separated from first waveguide layer 110 by a predetermined distance.

The first waveguide layer 110 has a proximal end 112 and a distal end 114. The first waveguide layer 110 includes a first pair of waveguides 116, 118 that extend from proximal end 112 along a first portion of first waveguide layer 110.

The first pair of waveguides 116, 118 each widen along a second portion of first waveguide layer 110 such that the first pair of waveguides 116, 118, merge into a single waveguide 119 toward distal end 114.

The second waveguide layer 120 has a proximal end 122 and a distal end 124. The second waveguide layer 120 includes a second pair of waveguides 126, 128 that extend from proximal end 122 along a first portion of second waveguide layer 120. The second pair of waveguides 126, 128 each narrow along a second portion of second waveguide layer 120 to respective distal tips 127, 129 at distal end 124.

The waveguide structure 102 is configured to couple an optical fiber 140 to an integrated photonics platform, such that an integrated photonics mode is matched to a fiber mode supported by optical fiber 140.

The first and second waveguide layers 110, 120 can be composed of various higher index optically transmissive materials, such as silicon, silicon nitride (SiNx), silicon oxynitride (SiON), silicon carbide (SiC), diamond, silicon germanium (SiGe), germanium, gallium arsenide (GaAs), gallium nitride (GaN), gallium phosphide (GaP), lithium niobate ($LiNbO_3$), titanium dioxide ($TiO_2$), or combinations thereof.

The cladding 104 can be composed of various lower index materials, such as silicon dioxide (SiO2), silicon oxynitride (SiON), zinc oxide (ZnO) (used with Si waveguide or other similarly high index waveguide), aluminum oxide ($Al_2O_3$), calcium fluoride ($CaF_2$), or combinations thereof.

The first pair of waveguides 116, 118 can each have a thickness of about 25 nm to about 100 nm, and the second pair of waveguides 126, 128 can each have a thickness of about 25 nm to about 100 nm. The second waveguide layer 120 is separated from the first waveguide layer 110 by a distance of about 1 μm to about 4 μm.

Various methods can be used to fabricate optical coupler 100, such as plasma enhanced chemical vapor deposition (PECVD), sputtering, low pressure CVD, atomic layer deposition, combinations thereof, or the like.

In other embodiments, more than two waveguide layers can be implemented to further improve efficiency of the fiber-to-waveguide optical coupler.

FIGS. 2A-2I depict an exemplary method of fabricating a fiber-to-waveguide optical coupler, such as optical coupler 100. Fabrication of the optical coupler begins with a wafer substrate 210 having an upper surface 212, as shown in FIG. 2A. The wafer substrate 210 can be formed of a first material that possesses a lower refractive index, such as silicon dioxide, for example. Next, a first waveguide layer 220 is formed by depositing a second material on upper surface 212 of wafer substrate 210, as shown in FIG. 2B. The second material has a higher refractive index than the first material. For example, the second material can be silicon nitride deposited to have a thickness of about 25 nm to about 100 nm on a silicon dioxide wafer using PECVD.

A first pair of waveguides are then formed from first waveguide layer 220 by conventional lithography, dry etching, and deposition techniques. As shown in FIG. 2C, a first pair of resist layers 222, 224 are formed on first waveguide layer 220 such as through resist spinning and lithography techniques. A pair of waveguides 230, 232 are then formed from first waveguide layer 220 by etching and resist removal, as depicted in FIG. 2D.

A first cladding layer 240 is then formed, by depositing the same first material as used for wafer substrate 210, over waveguides 230, 232, as depicted in FIG. 2E. For example, cladding layer 240 can be formed by depositing a layer of silicon dioxide having a thickness of about 2.5 μm to about 3.5 μm. An optional chemical mechanical planarization (CMP) process can be performed on an upper surface 242 of cladding layer 240.

Thereafter, a second waveguide layer 250 is formed by depositing the second material, having the higher refractive index, over upper surface 242 of cladding layer 240, as shown in FIG. 2F. For example, the second material can again be silicon nitride deposited to have a thickness of about 25 nm to about 100 nm on a silicon dioxide layer using PECVD.

A second pair of waveguides are then formed from second waveguide layer 250 by conventional lithography, dry etching, and deposition techniques. As shown in FIG. 2G, a pair of resist layers 252, 254 are formed on second waveguide layer 250 such as through resist spinning and lithography techniques. A pair of waveguides 260, 262 are then formed from first waveguide layer 250 by etching and resist removal, as depicted in FIG. 2H.

Finally, an additional amount of the first material, such as silicon dioxide, is deposited over waveguides 260, 262 to form a second cladding layer 270, as depicted in FIG. 2I. For example, cladding layer 270 can be formed by depositing a layer of silicon dioxide having a thickness of about 2 μm to about 4 μm.

Figure 3A:
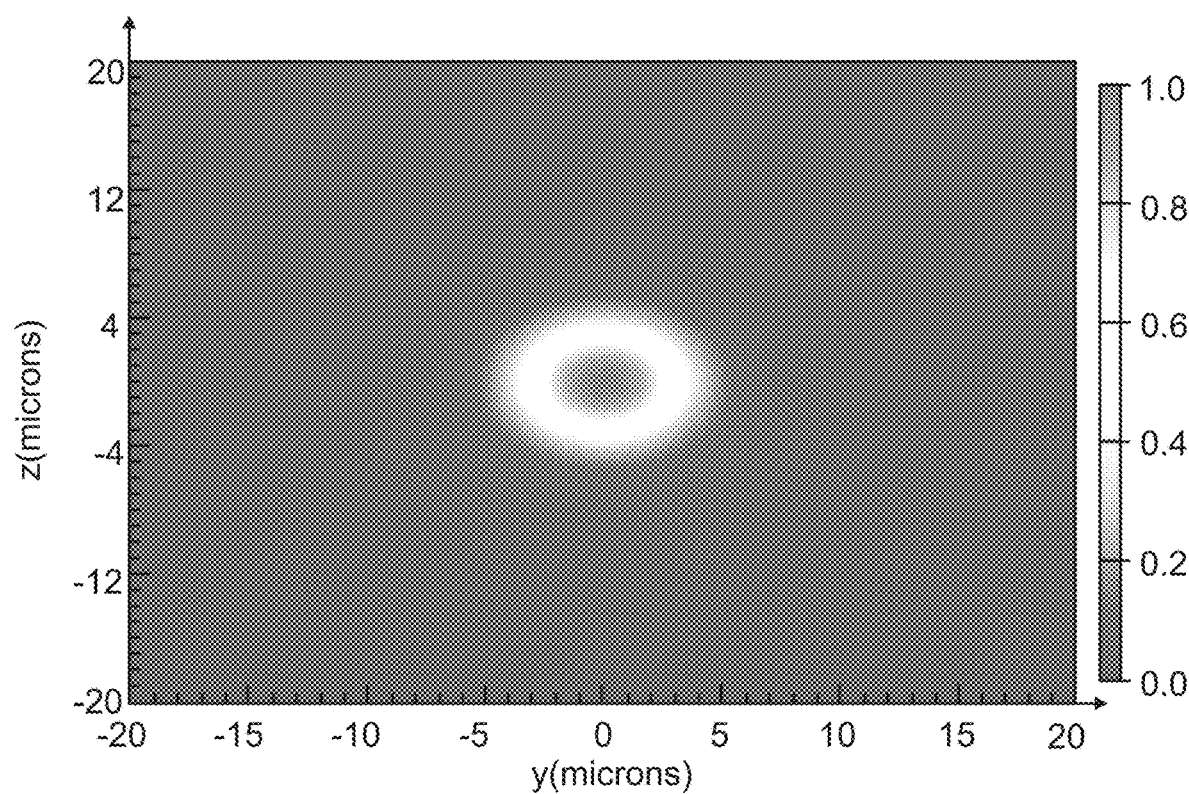
FIGS. 3A-3C are modeled graphical representations of simulated performance for a fiber-to-waveguide optical coupler, according to one implementation.
Figure 3B:
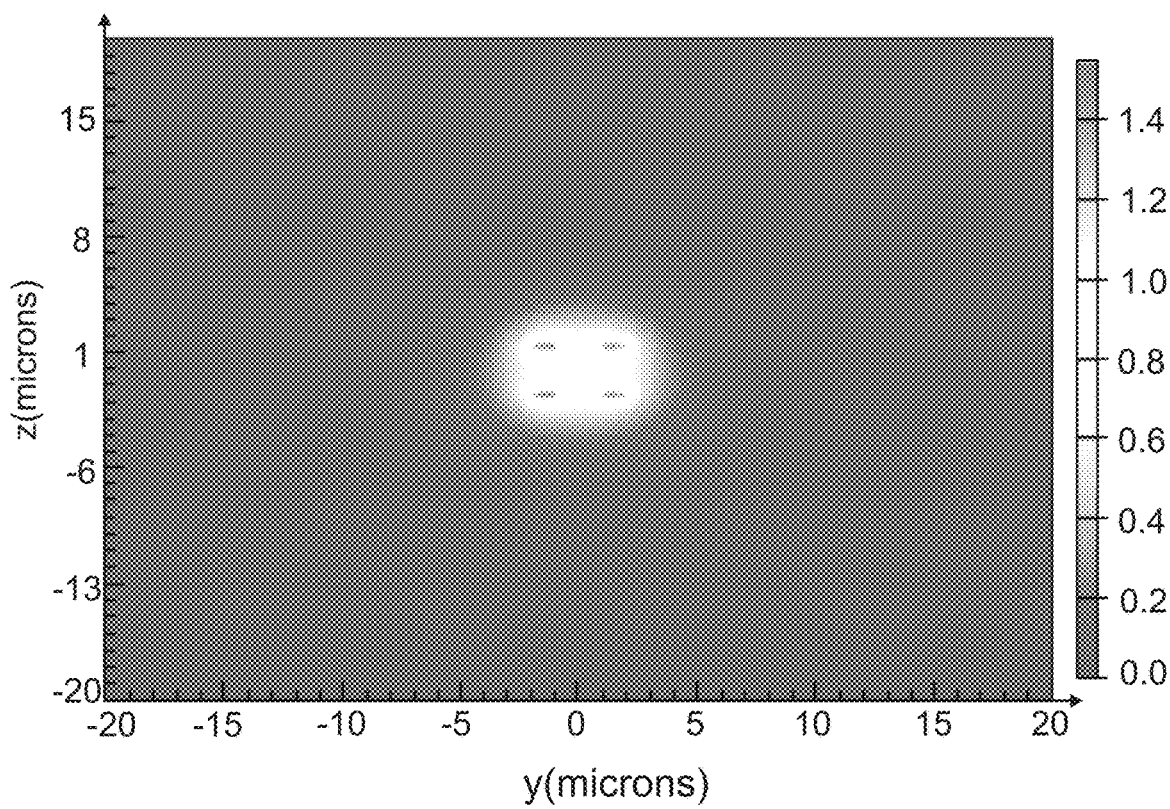
Figure 3C:
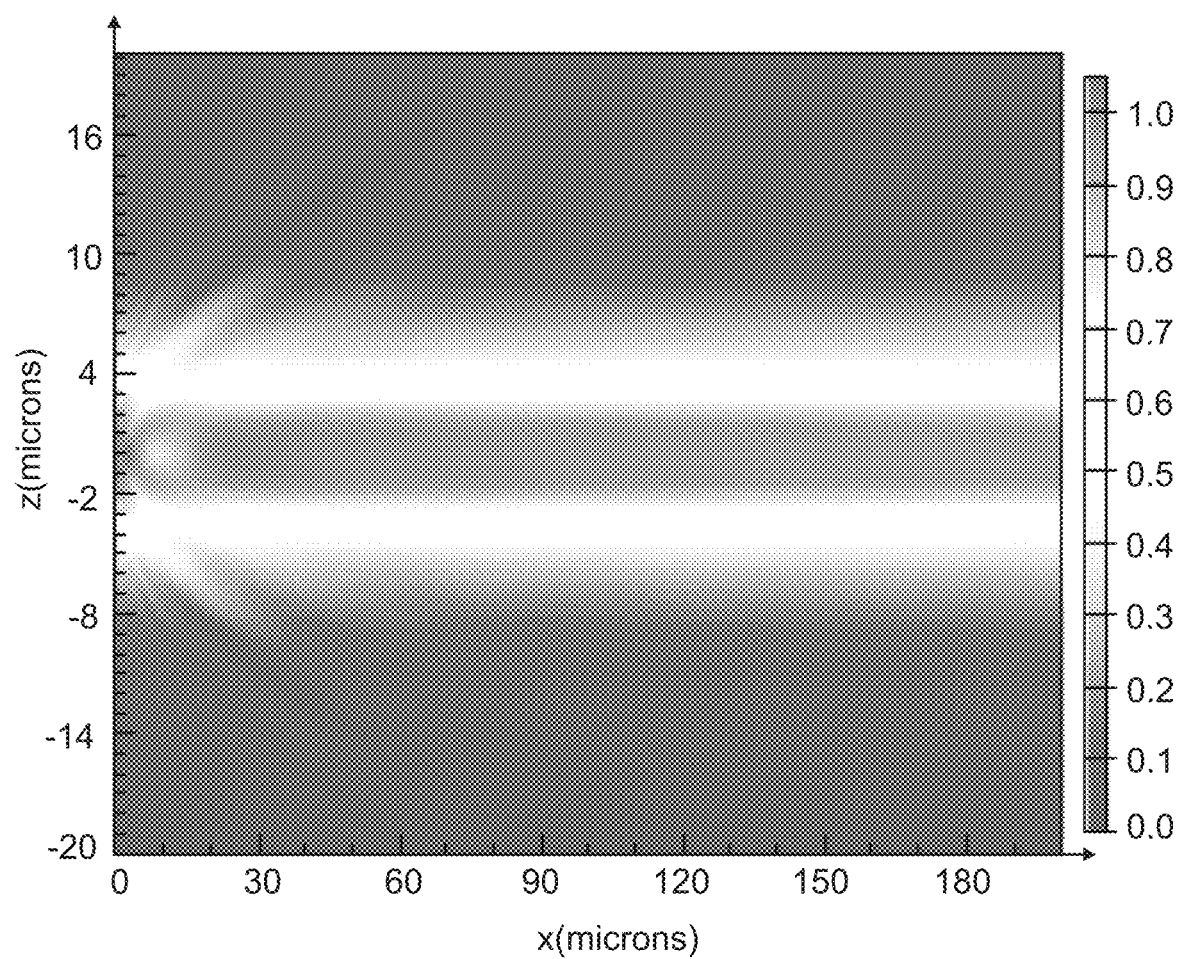

FIGS. 3A-3C are modeled graphical representations of the simulated performance of a fiber-to-waveguide optical coupler according to the present approach. The fiber-to-waveguide optical coupler for the simulation included four waveguides on two layers positioned to optimize the overlap integral with a fiber mode, which is shown in FIG. 3A. An integrated photonics waveguide mode is depicted in FIG. 3B, which shows that the waveguide mode is pulled apart and expanded by having the four waveguides so that the waveguide mode more closely resembles the shape of the fiber mode.

FIG. 3C shows a side-view simulated fiber-to-waveguide transition of an optical signal from an optical fiber to the fiber-to-waveguide optical coupler. The fiber mode was injected at the left end of the graph at x=0, and an abrupt transition for the four-waveguide structure of the coupler was located at about x=1 micron. FIG. 3C indicates that the transition of light from the fiber mode to the waveguide mode using the fiber-to-waveguide optical coupler would be about 99.17% efficient.

Figure 4:
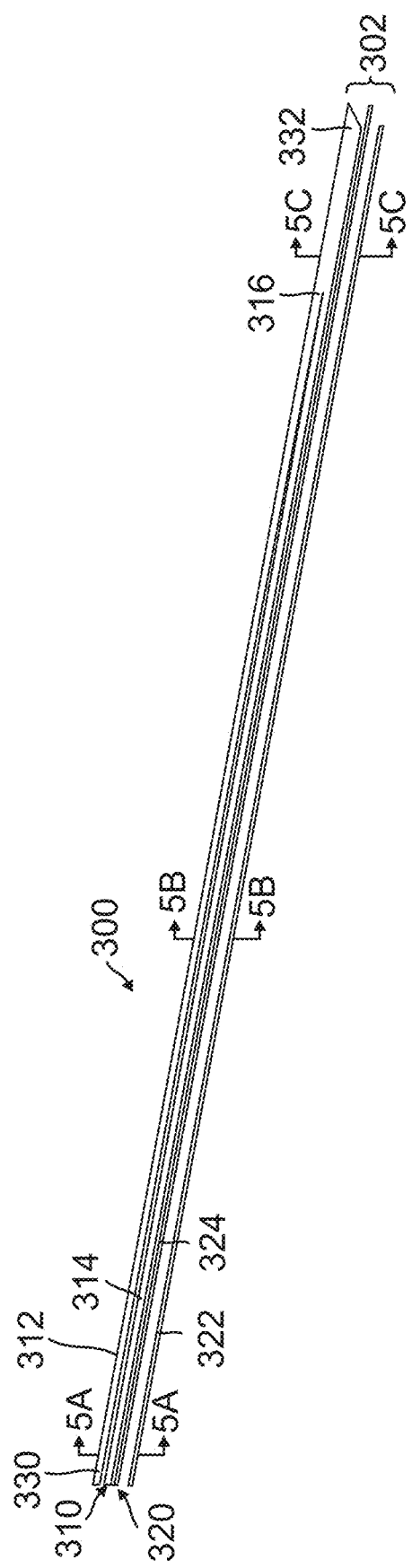
FIG. 4 is a perspective view of a fiber-to-waveguide optical coupler, according to an exemplary implementation.

FIG. 4 illustrates a fiber-to-waveguide optical coupler 300, according to an exemplary implementation. The optical coupler 300 comprises a waveguide structure 302 that includes a first waveguide layer 310, and a second waveguide layer 320 separated from first waveguide layer 310. The first waveguide layer 310 includes a first pair of waveguides 312, 314 that extend from an input end 330. The first pair of waveguides 312, 314 each widen toward an output end 332 such that the first pair of waveguides merge into a single waveguide 316. The second waveguide layer 320 includes a second pair of waveguides 322, 324 that extend from input end 330. The second pair of waveguides 322, 324 each narrow toward output end 332 and terminate at respective distal tips.

Following the fiber-to-waveguide transition (first transition) at input end 330 of optical coupler 300, the optical mode is adiabatically transitioned (second transition) into the first waveguide layer 310 toward output end 332. This second transition has a greater than about 99.9% efficiency.

Figure 5A:
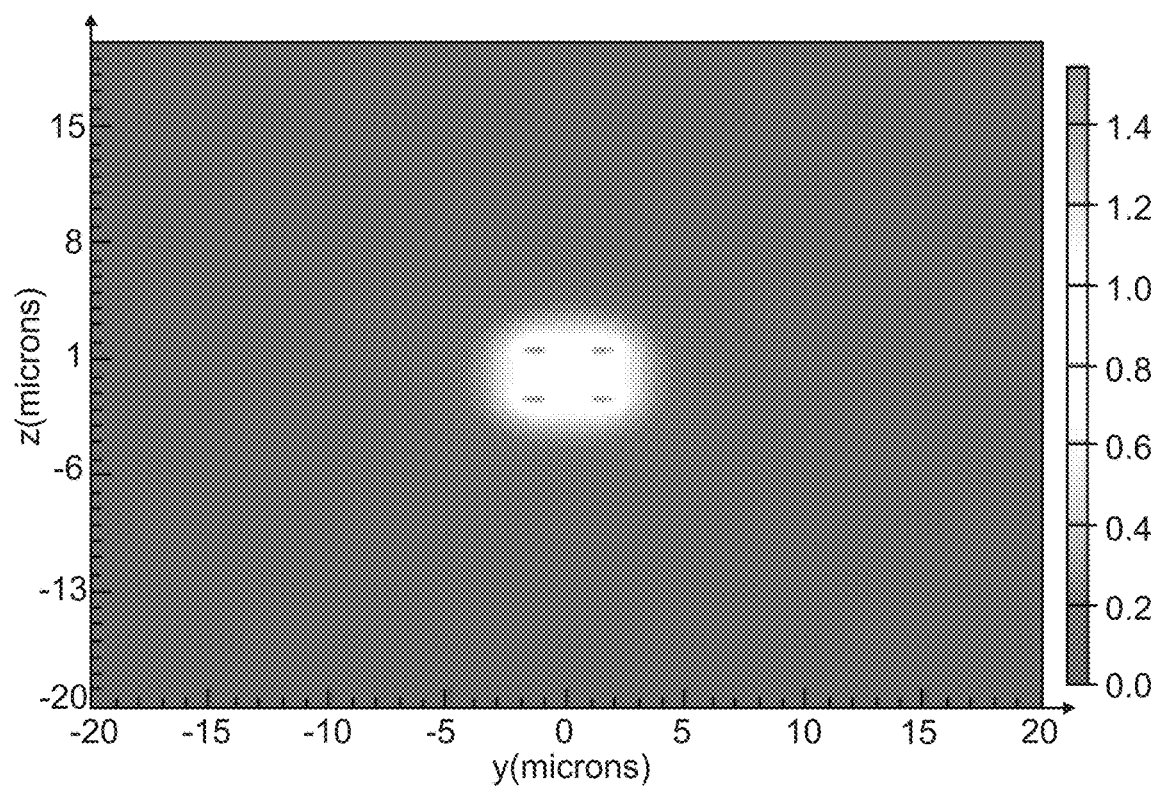
FIGS. 5A-5C are modeled graphical representations of the simulated mode profile transitions for the optical coupler of FIG. 4.
Figure 5B:
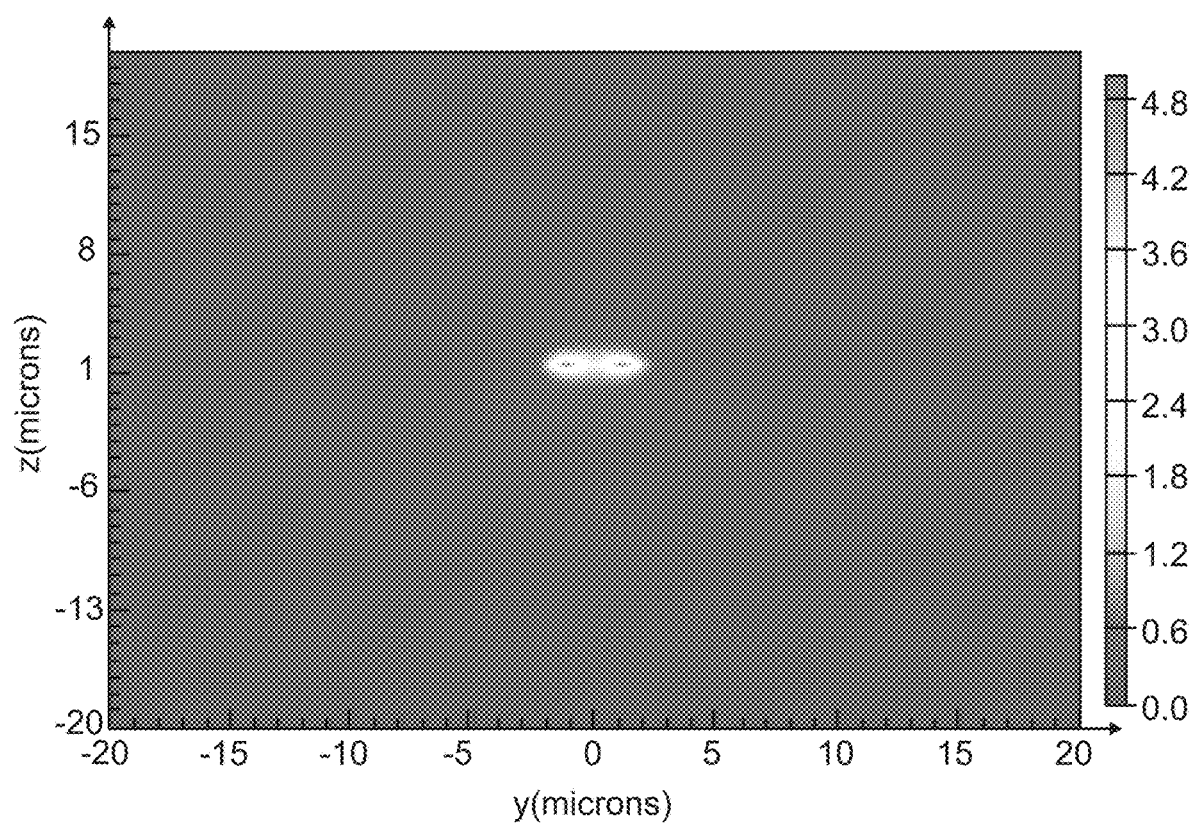
Figure 5C:
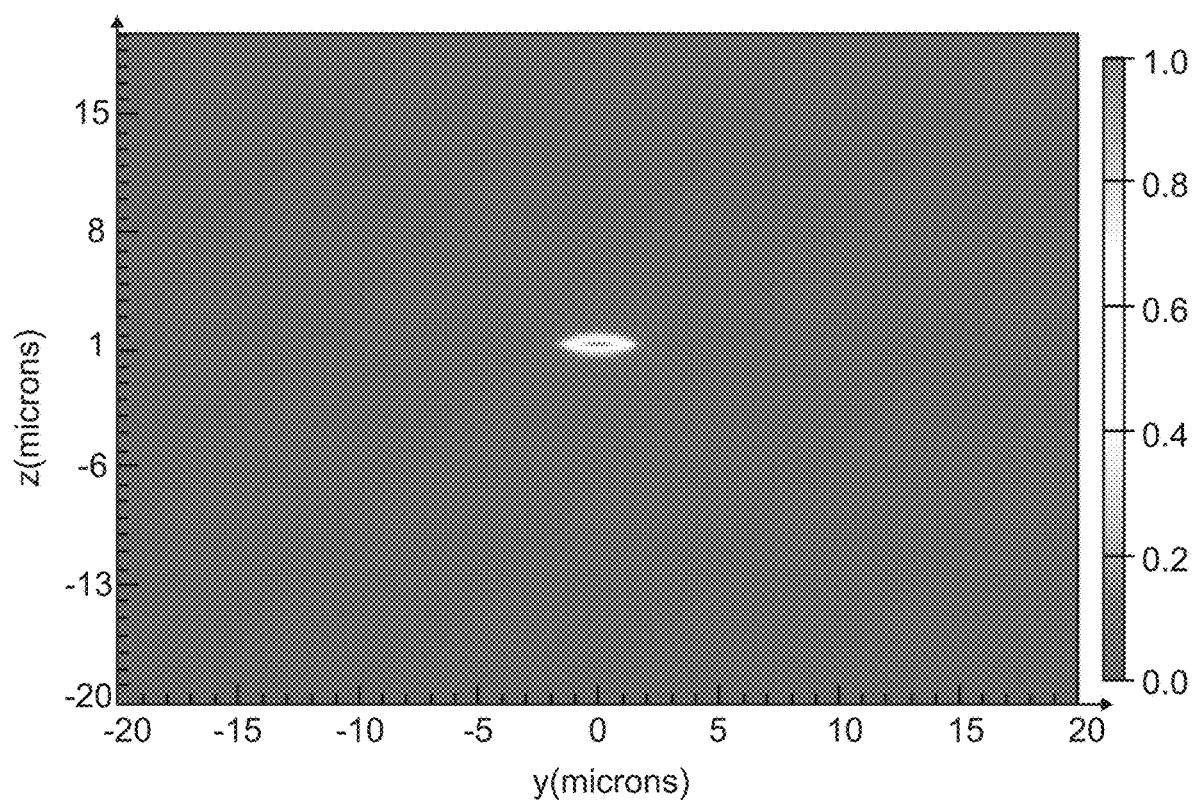

FIGS. 5A-5C are modeled graphical representations of the simulated mode profile transitions taken along optical coupler 300 of FIG. 4, from input end 330 (lines 5A) to output end 332 (lines 5C). As shown in FIG. 5A, the mode profile of the light is equally spaced in the waveguide layers 310, 320 at input end 330. The mode profile then transitions to the pair or waveguides 312, 314 in the first waveguide layer 310, as shown in FIG. 5B. Thereafter, the mode profile transitions into single waveguide 316 toward output end 332, as depicted in FIG. 5C.

Example Embodiments

Example 1 includes an optical coupler, comprising: a waveguide structure comprising a first waveguide layer having a proximal end and a distal end, the first waveguide layer including a first pair of waveguides that extend from the proximal end along a first portion of the first waveguide layer, wherein the first pair of waveguides each widen along a second portion of the first waveguide layer such that the first pair of waveguides merge into a single waveguide toward the distal end; and a second waveguide layer separated from the first waveguide layer, the second waveguide layer having a proximal end and a distal end, the second waveguide layer including a second pair of waveguides that extend from the proximal end of the second waveguide layer along a first portion of the second waveguide layer, wherein the second pair of waveguides each narrow along a second portion of the second waveguide layer to separate distal tips at the distal end of the second waveguide layer; wherein the waveguide structure is configured to match an integrated photonics mode to a fiber mode supported by an optical fiber.

Example 2 includes the optical coupler of Example 1, wherein the first and second pairs of waveguides comprise a high index optically transmissive material.

Example 3 includes the optical coupler of any of Examples 1-2, wherein the first and second pairs of waveguides comprise silicon, silicon nitride, silicon oxynitride, silicon carbide, diamond, silicon germanium, germanium, gallium arsenide, gallium nitride, gallium phosphide, lithium niobate, titanium dioxide, or combinations thereof.

Example 4 includes the optical coupler of any of Examples 1-3, wherein the first pair of waveguides have a thickness of about 25 nm to about 100 nm.

Example 5 includes the optical coupler of any of Examples 1-4, wherein the second pair of waveguides have a thickness of about 25 nm to about 100 nm.

Example 6 includes the optical coupler of any of Examples 1-5, wherein the second waveguide layer is separated from the first waveguide layer by a distance of about 2.5 μm to about 3.5 μm.

Example 7 includes the optical coupler of any of Examples 1-6, wherein the first and second waveguide layers are embedded in a cladding.

Example 8 includes the optical coupler of Example 7, wherein the cladding comprises a low index material.

Example 9 includes the optical coupler of any of Examples 7-8, wherein the cladding comprises silicon dioxide, silicon oxynitride, zinc oxide, aluminum oxide, calcium fluoride, or combinations thereof.

Example 10 includes a method of fabricating an optical coupler, the method comprising: providing a wafer substrate having an upper surface, the wafer substrate formed of a first material having a first refractive index; forming a first waveguide layer of a second material on the upper surface of the wafer substrate, the second material having a second refractive index that is higher than the first refractive index; removing portions of the second material from the first waveguide layer to form a first pair of waveguides along the first waveguide layer; forming a first cladding layer of the first material over the first pair of waveguides; forming a second waveguide layer of the second material over the first cladding layer; removing portions of the second material from the second waveguide layer to form a second pair of waveguides along the second waveguide layer; and forming a second cladding layer of the first material over the second pair of waveguides; wherein the first pair of waveguides are formed to widen along a portion of the first waveguide layer such that the first pair of waveguides merge into a single waveguide toward a distal end of the first waveguide layer; wherein the second pair of waveguides are formed to narrow along a portion of the second waveguide layer to separate distal tips at a distal end of the second waveguide layer.

Example 11 includes the method of Example 10, wherein the first material comprises silicon dioxide, silicon oxynitride, zinc oxide, aluminum oxide, calcium fluoride, or combinations thereof.

Example 12 includes the method of any of Examples 10-11, wherein the second material comprises silicon, silicon nitride, silicon oxynitride, silicon carbide, diamond, silicon germanium, germanium, gallium arsenide, gallium nitride, gallium phosphide, lithium niobate, titanium dioxide, or combinations thereof.

Example 13 includes the method of any of Examples 10-12, wherein the first pair of waveguides is formed to have a thickness of about 25 nm to about 100 nm.

Example 14 includes the method of any of Examples 10-13, wherein the second pair of waveguides is formed to have a thickness of about 25 nm to about 100 nm.

Example 15 includes the method of any of Examples 10-14, wherein the second waveguide layer is separated from the first waveguide layer by a distance of about 2.5 μm to about 3.5 μm.

Example 16 includes the method of any of Examples 10-15, wherein the first and second waveguide layers are formed by a process comprising plasma enhanced chemical vapor deposition, sputtering, low pressure chemical vapor deposition, atomic layer deposition, or combinations thereof.

Example 17 includes the method of any of Examples 10-16, wherein the first and second cladding layers are formed by a process comprising plasma enhanced chemical vapor deposition, sputtering, low pressure chemical vapor deposition, atomic layer deposition, or combinations thereof.

Example 18 includes the method of any of Examples 10-17, wherein the portions of the second material are removed from the first and second waveguide layers by a process comprising a lithography-based procedure, followed by dry etching.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:
1. An optical coupler, comprising:
a waveguide structure comprising:
a first waveguide layer having a proximal end and a distal end, the first waveguide layer including a first pair of waveguides that extend from the proximal end along a first portion of the first waveguide layer, wherein the first pair of waveguides each widen along a second portion of the first waveguide layer such that the first pair of waveguides merge into a single waveguide toward the distal end; and a second waveguide layer separated from the first waveguide layer, the second waveguide layer having a proximal end and a distal end, the second waveguide layer including a second pair of waveguides that extend from the proximal end of the second waveguide layer along a first portion of the second waveguide layer, wherein the second pair of waveguides each narrow along a second portion of the second waveguide layer to separate distal tips at the distal end of the second waveguide layer;

wherein the waveguide structure is configured to match an integrated photonics mode to a fiber mode supported by an optical fiber.

2. The optical coupler of claim 1, wherein the first and second pairs of waveguides comprise a high index optically transmissive material.

3. The optical coupler of claim 1, wherein the first and second pairs of waveguides comprise silicon, silicon nitride, silicon oxynitride, silicon carbide, diamond, silicon germanium, germanium, gallium arsenide, gallium nitride, gallium phosphide, lithium niobate, titanium dioxide, or combinations thereof.

4. The optical coupler of claim 1, wherein the first pair of waveguides have a thickness of about 25 nm to about 100 nm.

5. The optical coupler of claim 1, wherein the second pair of waveguides have a thickness of about 25 nm to about 100 nm.

6. The optical coupler of claim 1, wherein the second waveguide layer is separated from the first waveguide layer by a distance of about 2.5 µm to about 3.5 µm.

7. The optical coupler of claim 1, wherein the first and second waveguide layers are embedded in a cladding.

8. The optical coupler of claim 7, wherein the cladding comprises a low index material.

9. The optical coupler of claim 7, wherein the cladding comprises silicon dioxide, silicon oxynitride, zinc oxide, aluminum oxide, calcium fluoride, or combinations thereof.

10. A method of fabricating an optical coupler, the method comprising:

providing a wafer substrate having an upper surface, the wafer substrate formed of a first material having a first refractive index;

forming a first waveguide layer of a second material on the upper surface of the wafer substrate, the second material having a second refractive index that is higher than the first refractive index;

removing portions of the second material from the first waveguide layer to form a first pair of waveguides along the first waveguide layer;

forming a first cladding layer of the first material over the first pair of waveguides;

forming a second waveguide layer of the second material over the first cladding layer;

removing portions of the second material from the second waveguide layer to form a second pair of waveguides along the second waveguide layer; and forming a second cladding layer of the first material over the second pair of waveguides;

wherein the first pair of waveguides are formed to widen along a portion of the first waveguide layer such that the first pair of waveguides merge into a single waveguide toward a distal end of the first waveguide layer;

wherein the second pair of waveguides are formed to narrow along a portion of the second waveguide layer to separate distal tips at a distal end of the second waveguide layer.

11. The method of claim 10, wherein the first material comprises silicon dioxide, silicon oxynitride, zinc oxide, aluminum oxide, calcium fluoride, or combinations thereof.

12. The method of claim 10, wherein the second material comprises silicon, silicon nitride, silicon oxynitride, silicon carbide, diamond, silicon germanium, germanium, gallium arsenide, gallium nitride, gallium phosphide, lithium niobate, titanium dioxide, or combinations thereof.

13. The method of claim 10, wherein the first pair of waveguides is formed to have a thickness of about 25 nm to about 100 nm.

14. The method of claim 10, wherein the second pair of waveguides is formed to have a thickness of about 25 nm to about 100 nm.

15. The method of claim 10, wherein the second waveguide layer is separated from the first waveguide layer by a distance of about 2.5 µm to about 3.5 µm.

16. The method of claim 10, wherein the first and second waveguide layers are formed by a process comprising plasma enhanced chemical vapor deposition, sputtering, low pressure chemical vapor deposition, atomic layer deposition, or combinations thereof.

17. The method of claim 10, wherein the first and second cladding layers are formed by a process comprising plasma enhanced chemical vapor deposition, sputtering, low pressure chemical vapor deposition, atomic layer deposition, or combinations thereof.

18. The method of claim 10, wherein the portions of the second material are removed from the first and second waveguide layers by a process comprising a lithography-based procedure, followed by dry etching.

* * * * *